3,639,532
ESTERS AND/OR AMIDES OF ACIDS OF PHOSPHORUS CONTAINING A GROUP HAVING THE FORMULA ROCH₂NHCO—

Gunter Oertel, Cologne-Flittard, Hans Holtschmidt, Leverkusen-Steinbuechel, and Wolfgang Carl, Dormagen, Germany, assignors to Farbenfabriken Bayer Aktiengesellschaft, Leverkusen, Germany
No Drawing. Filed Apr. 23, 1968, Ser. No. 723,584
Claims priority, application Germany, Apr. 25, 1967, F 52,234
Int. Cl. C07f 9/24; C07d 105/02; C08f 45/85
U.S. Cl. 260—923          4 Claims

ABSTRACT OF THE DISCLOSURE

Sulfur free esters and/or amides of acids of phosphorus which contain at least one group having the formula ROCH₂NHCO—, wherein R is alkyl, useful as additives for resins to impart flame-resistance.

---

This invention relates to phosphorus esters and/or amides and more particularly to derivatives which have improved ability to impart flame-resistance to resins and the like.

Phosphorus compounds are known to have flame-resistant properties. Many of them can therefore be used to impart flame-resistance to resins including synthetic resins and fibers. Thus, it has been known heretofore to use trichloroethyl or dibutyl phosphate as flame-resistant additives for plastics, but these additives diffuse out and thus their effect is lost. In addition, some compounds which may have other utility, as the compounds of German Pat. 1,138,977 decompose in a flame or under high heat to produce noxious fumes and poisonous gases. Others, even if they produce no undesirable by-products, are themselves poisonous and cannot be used for textiles, coatings, foamed plastics and the like for home use. Even if all of these disadvantages are overcome, one must determine what effect the additive to impart flame-resistance will have on the other physical properties of the material to be made flame-resistant. Many heretofore known phosphorus additives only improve the flame-resistance of a substance at the expense of some other physical property such as color, tensile strength or the like. This is particularly true for textiles where one must pay attention to hand, drape, absorbency, dyeing and dye-fastness, strength, durability, washfastness and cost. The heretofore known phosphorus compounds have suffered from one or more of the foregoing disadvantages.

It is therefore an object of this invention to provide new compositions of matter which do not have the foregoing disadvantages and can, therefore, be used in the production of improved fire-resistant materials. Another object of this invention is to provide an improved process of preparing addition products of esters and/or amides of acids of phosphorus which are free from sulfur. Another object of this invention is to provide improved fire-resistant fibers, foils, textiles and the like. Still a further object of this invention is to provide new compositions of matter which will impart fire-resistance to plastic products without affecting their other properties. Still another object of this invention is to provide an improved way of rendering materials flame proof and/or flame-resistant. Another object of this invention is to provide a fire-resistant polyurethane, polycarbonate, polystyrene and the like.

The foregoing objects and other which will become apparent from the following description are accomplished in accordance with the invention, generally speaking, by providing sulfur free esters and/or amides of acids of phosphorus which contain at least one group having the formula ROCH₂NHCO—, wherein R is alkyl. Therefore, this invention contemplates compounds having the formula (ROCH₂NHCO)ₙR′, wherein R is alkyl, R′ is obtained by removing all or part of the Zerewitinoff active hydrogen from a sulfur free ester or amide of an acid of phosphorus and $n$ is a positive integer, preferably 1–6 which corresponds to the number of active hydrogens removed from said sulfur free ester or amide of an acid of phosphorus. In the foregoing formula R is preferably lower alkyl having 1–6 carbon atoms such as methyl, ethyl, propyl, isopropyl, n-butyl, isobutyl, sec-butyl, tert.-butyl, n-amyl, isoamyl, n-hexyl, 2-hexyl, 3-hexyl and the like. R′ preferably represents the radical obtained by removing one hydrogen atom which is reactive with an —NCO group (i.e., active as determined by the Zerewitinoff method) from a sulfur free ester or amide of an acid of phosphorus having a molecular weight below 600. When the molecular weight is above 600 the products are somewhat difficult to use as fire-resistant additives.

The alkoxymethyl amide group, ROCH₂—NH—CO— may be linked to the phosphorus acid moiety by a direct bond to the phosphorus atom or through a linkage as illustrated in the equations below.

The compounds of the invention can be prepared, for example, by the reaction between a Zerewitinoff active hydrogen atom on an ester and/or amide of a sulfur free acid of phosphorus and an alkoxymethyl isocyanate according to the following equation

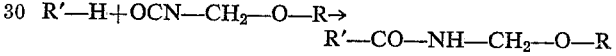

where R and R′ have the meanings set forth above. This leads to the phosphorylated N-alkoxymethylamide of the type characterized above, in which R′ denotes the radical of an ester or amide of an acid of phosphorus and R denotes an alkyl radical regardless of which of the different types of Zerewitinoff active hydrogen atoms described below is involved in the reaction. Examples of functional groups in esters or amides of acids of phosphorus, and their conversion according to the invention into N-alkoxymethylamide derivatives, are illustrated schematically in the following equations.

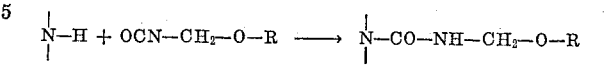
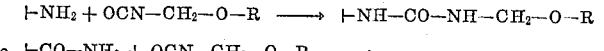
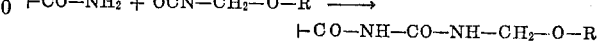
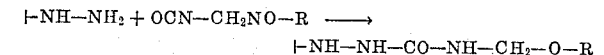
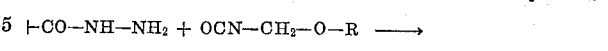
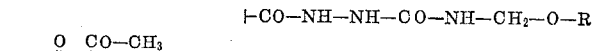
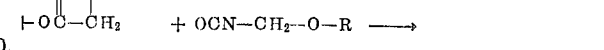
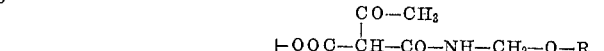
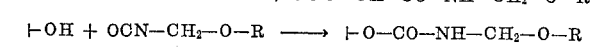
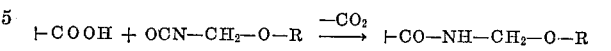
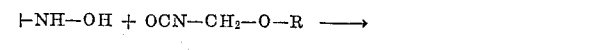
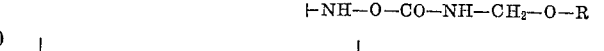

The functional groups in the above scheme can be linked to the phosphorus atom of the ester or amide of phosphorus through carbon, oxygen, nitrogen or directly. One example of a direct link between the Zerewitinoff active hydrogen atom and the phosphorus atom is found in the reaction, formulated in the last of the above equations, between a PH acid compound, e.g., a phosphorus acid diester, -diamide or -ester amide, and an alkoxymethylisocyanate.

Esters and amides of acids of phosphorus which may be used as starting in the process according to the invention may contain one or more Zerewitinoff active hydrogen atoms which may be of the same type or different; for example, OH groups may be present together with NH groups, or PH groups may be present in the same molecule.

Furthermore, not all the Zerewitinoff active hydrogen atoms present in an ester or amide of an acid of phosphorus need be reacted with alkoxymethylisocyanates. They may, in fact, react selectively and partially, especially if they have different reactivities.

The sulfur free esters or amides of acids of phosphorus that may be used as starting materials for the reaction according to the invention are mainly esters and amides of phosphinous, phosphinic, phosphonous, phosphonic, phosphorous and phosporic acids. Any of these phosphorus compounds may be used for the reaction with alkoxymethylisocyanates, provided they have Zerewitinoff active hydrogen atoms in the molecule, e.g., in the form of the substituents mentioned by way of example in the above scheme. It is essential, however, that the compounds be free of sulfur because sulfur not only makes the compounds toxic and unsuitable for many uses, for example, where they are used to flameproof substances that come in contact with food, but also where the substance may be subjected to a fire. The sulfur-containing compounds react with oxygen in a fire to produce noxious gases that are almost as harmful as the fire itself Table I lists examples of sulfur-free esters of phosphorous acids, wherein it will be noted that the compounds have a total of 4 to 18 carbon atoms as benzene rings, straight or branched chain hydrocarbon groups of from 1 to 6 carbon atoms, and such hydrocarbon groups (1) interrupted with a nitrogen or oxygen atom, or (2) substituted with a hydroxy, amino, chloro or bromo group. The from 1 to 3 Zerewitinoff hydrogens that can be replaced are indicated by ($\sqrt{}$).

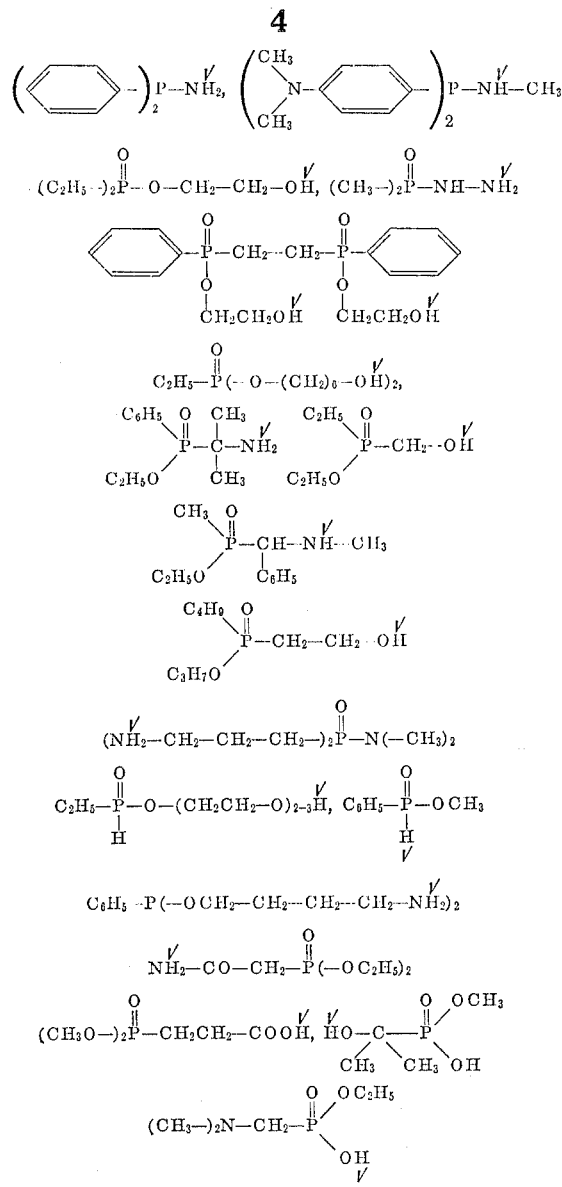

TABLE I

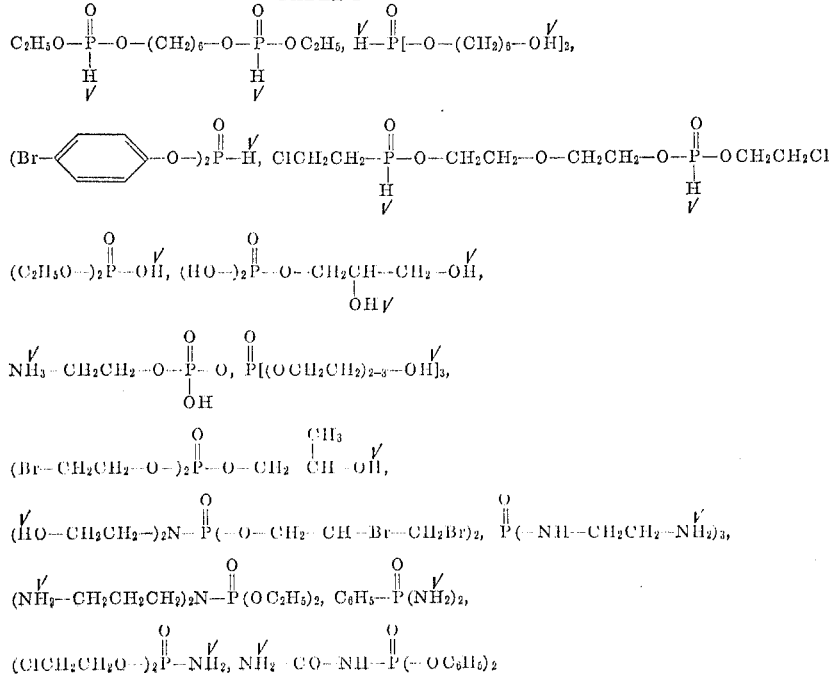

TABLE I—Continued

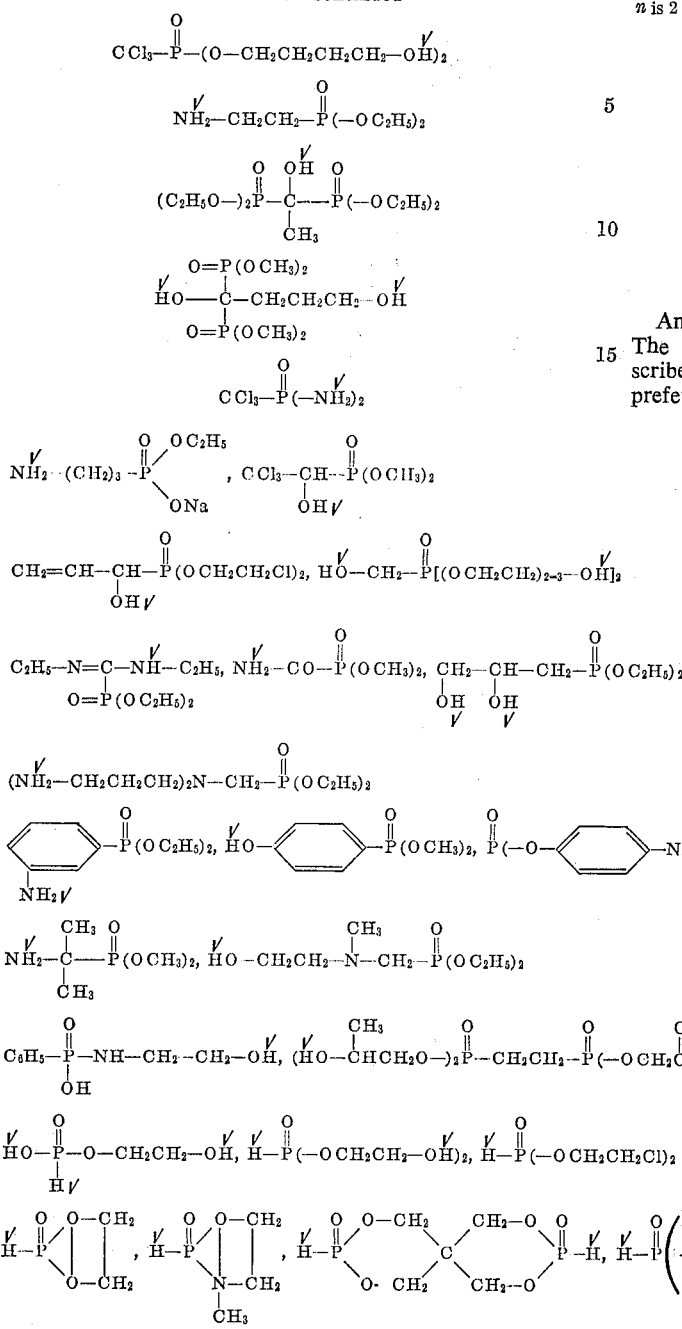

For convenience, Table II summarizes the radicals obtained by removing Zerewitinoff hydrogens from the phosphorous acid compounds used in the examples.

TABLE II n is 1

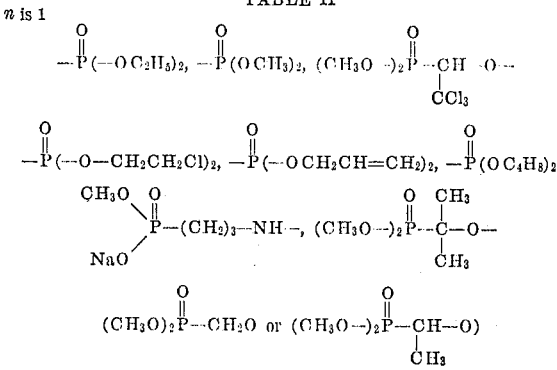

n is 2

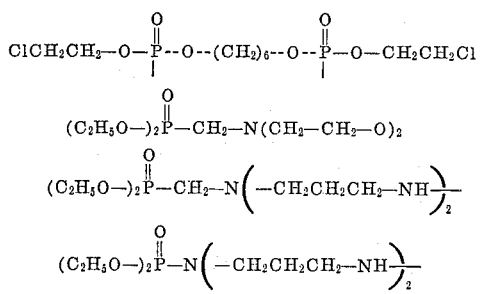

Any suitable alkoxymethylisocyanate may be used. The alkoxymethyl isocyanates may be prepared as described in German patent specification 1,205,087. The preferred alkoxymethylisocyanates are those which contain 1 to 6 carbon atoms in the alkoxy group, such as methoxy, ethoxy, propoxy, n-butoxy, 2-butoxy, isopropoxy or n-hexyloxymethylisocyanate. Methoxymethylisocyanate is most preferably used.

In view of the great number of possible starting materials and their physical and chemical properties, the reaction conditions under which the reaction according to the invention is carried out may vary within certain limits. The reaction is preferably carried out at temperatures from about −50 to about 180° C., most preferably at about 10 to about 100° C., in bulk, solution, suspension or emulsion.

Any compounds that are inert to isocyanates may be used as solvents or diluents. These include, for example, (chlorinated) hydrocarbons, ethers, esters, ketones, dialkylcarboxylic acid amides, sulphones, sulphoxides or nitriles. If, however, the Zerewitinoff active groups contained in the phosphorus compound which is to be reacted with the alkoxymethyl isocyanate contains basic primary or secondary amino or hydrazino groups, then the reaction may also be carried out in solvents or diluents which contain hydroxyl groups, for example, alcohols or water, since in this case the isocyanate reacts selectively with the more highly reactive amino groups.

One may either place the isocyanate in solution or in bulk in the reaction vessel and add the phosphorus compound thereto, either in bulk or in solution or emulsion or suspension, or add the isocyanate to the phosphorous compound. Depending on the type of end product required, the alkoxymethyl isocyanate may be added either in stoichiometric quantity or in excess or in less than the stoichiometric quantity relative to the quantity of Zerewitinoff active hydrogen atoms in the phosphorus compound. Excess isocyanate can easily be removed after the reaction by heating the reaction products or their solutions, preferably under reduced pressure.

The reaction according to the invention in many cases proceeds satisfactorily even in the absence of catalysts. In some cases, however, it is advisable to add the known catalysts for isocyanate reactions, such as tertiary amines, alkali metals or alcoholates, organo tin compounds and metal salts preferably in quantities of 0.001 to 1.0% to the reaction mixture.

The esters and amides of acids of phosphorus obtainable by the process according to the invention are characterized, as already explained initially in this text, by the presence of one or more groups of the general formula

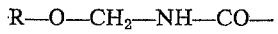

in the molecule, wherein R denotes an alkyl radical. This N-alkoxymethylamide group, when bonded to a sulfur free phosphorus ester or amide, distinguishes the products of the process from all known phosphorus compounds and imparts special, commercially valuable properties to them.

As is well known, almost all organic phosphorus compounds have a flame resistant character or are non-combustible. Many of them are, therefore, also used as flame-protective additives for easily inflammable synthetic resins and fibers. However, the phosphorus compounds function by forming a char by-product when burned and this product or by-products of its formation must not itself be toxic.

N-alkoxy groups, especially N-methoxymethyl groups, are known to be capable of reacting with themselves or with OH or NH groups when heated, especially in the presence of acids, alcohol being split off and the reaction resulting in an increase in molecular weight, and finally in cross-linking or, when high molceular weight compounds which themselves contain the last mentioned groups are present, the reaction results in condensation of the compound containing the N-methoxymethyl radicals with the high molecular weight product.

The esters and amides of sulfur free acids of phosphorus obtainable by the process according to the invention thus represent valuable flame protective agents for use in the production of all sorts of different resins. They are suitable, inter alia, for providing flame protective finishes to shaped articles such as foam plastics, films, lacquers and fibers made of different types of materials such as polyurethane, polycarbonate, polystyrene, polyethylene polyvinyl acetate, cellulose, etc. The polyurethanes may be prepared by the process discloses in U.S. Reissue Pat. 24,514 and polyarylcarbonates are preferred and may be prepared by the process of U.S. Pat. 3,028,365. The new products are distinctly superior in their flame protective effect to the esters and amides of acids of phosphorus previously used for this purpose. Their special advantage is that they can be firmly linked to the substrate, for example, to the synthetic resin, through their N-alkoxy methyl groups by heat treatment and/or the actions of acids (shown in the working examples below). Whereas the usual flame protective agents such as trichloroethyl- or dibutylphosphate can easily diffuse out of the synthetic resin owing to their high vapor pressure, this not possible in the case of the "functional" flame-protective agents obtainable by the process according to the invention. This effect is of special interest in its application to textiles where the large surface area of the fibers greatly promotes the evaporation of volatile flame-protective agents. In addition, flame-protective finishes applied to fibers or textiles in the form of simple esters or amides of acids of phosphorus are generally not resistant to washing. Owing to the possibility of reacting on or in the fiber with themselves or with other reactive groups through the N-alkoxymethyl groups to produce higher molecular weight products, the substances obtained by the process according to the invention are distinguished by exceptionally high resistance to washing if suitably applied.

For the reasons given above, the new products described hereinabove all have flame-protective properties when applied to fibers and foils, for example, of polyacrylonitrile, polyamide, polyesters, cotton and wool. One special advantage they have is that they are effective even at low concentrations. They reach their maximum effectiveness at applications of only 3 to 15% on the fiber, preferably 4 to 6% (based on the weight of fiber) or when added in amounts of 10 to 15% to polymers.

Another advantage of the products which can be prepared according to the invention is that they do not affect any of the properties of the articles treated or of the polymers provided with additives other than the combustibility.

The invention is further illustrated by the following examples in which parts are by weight unless otherwise specified.

EXAMPLE 1

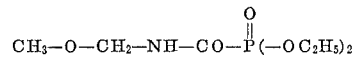

About 3095 g. of methoxymethyl isocyanate are added at about 30 to about 40° C. to a solution of about 74 g. of sodium diethylphosphite in about 4910 g. of diethylphosphite. An exothermic reaction takes place. The temperature of the mixture is maintained between about 30 and about 50° C. by external cooling with water and the reaction mixture is then stirred for about one hour at about 50° C., and is degasified for about 30 minutes under reduced pressure (water jet pump) at about 60° C. to remove traces of unreacted starting materials.

The yield is about 8.0 kg. of a colorless liquid of refractive index $n_D^{20}$: 1.4504.

The infra-red spectrum of this substance shows characteristic bands for CO at 1670 cm.$^{-1}$, for POC at 1030 cm.$^{-1}$ and for $CH_3OCH_2$ at 1070 cm.$^{-1}$.

If polyacrylonitrile fiber flock or fiber yarn is treated at room temperature with aqueous solutions of the above mentioned compound (concentrated 240 g./l.) centrifuged to reduce the moisture content to about 25% and dried at about 120° C., they show a considerable reduction in combustibility.

EXAMPLE 2

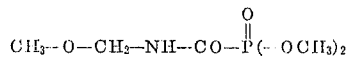

A spatula tip of sodium methylate is added to an emulsion of about 275 g. of dimethylphosphite in about 300 ml. of ligroin, and about 218 g. of methoxymethyl isocyanate are then slowly added dropwise at about 40 to 60° C. to the reaction mixture. The temperature of the reaction mixture is maintained within the given range by cooling with ice water, and the reaction is taken to completion by heating the mixture at about 80 to 90° C. for about 2 hours. The reaction product separates as oily phase from the ligroin solution. It is separated and dried under reduced pressure at about 50° C.

About 493 g. of a colorless liquid of refractive index $n_D^{20}=1.4535$ are obtained.

EXAMPLE 3

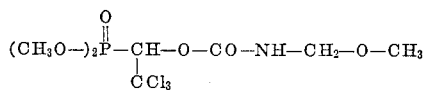

About 24.15 g. of α-hydroxy-β,β,β-trichloroethylphosphonic acid, O,O-dimethylester are dissolved in about 50 ml. of methylene chloride. About 0.5 ml. of triethylamine is added to the solution and thereafter about 9 g. of methoxymethyl isocyanate are added dropwise at about 30 to about 40° C. with external cooling. When the exothermic reaction that sets in has died down, the resulting clear solution is heated to boiling for about one hour and then concentrated by evaporation under reduced pressure. About 33 g. of a yellow oil remains behind which crystallizes when left to stand for some time. Solvent was removed by pressing the crystals on clay and they were dried at about 40 to about 50° C. under reduced pressure. About 17 g. of colorless crystals of melting point about 91° C. are obtained.

EXAMPLE 4

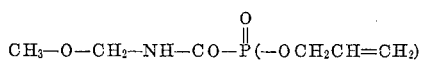

From about 310.5 g. of β,β-dichloroethylphosphite and about 135 g. of methoxymethyl isocyanate, about 430 g. of the above compound are obtained by the method used in Example 1 in the form of a colorless liquid having a refractive index of $n_D^{20}=1.4855$.

EXAMPLE 5

About 582 g. of the compound of the above formula are obtained in the form of a reddish liquid of refractive index $n_D^{20}=1.4722$ by reacting about 380 g. of diallylphosphite and about 205 g. of methoxymethyl isocyanate by the method described in Example 1.

EXAMPLE 6

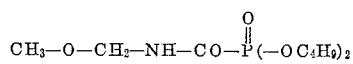

About 141 g. of the above compound are obtained in the form of a colorless liquid ($n_D^{20}=1.4510$) from about 97 g. of dibutyl phosphite and about 43.5 g. of methoxymethyl isocyanate by the method described in Example 3.

*Analysis.*—Molecular weight: 281. Calculated (percent): C, 47.0; H, 8.55; P, 11.0. Found (percent): C, 47.1; H, 8.63; P, 10.8.

EXAMPLE 7

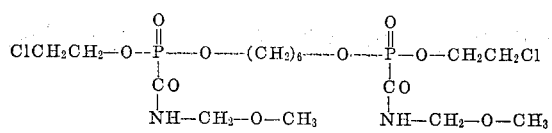

To about 185.5 g. of the phosphoric ester of the following formula

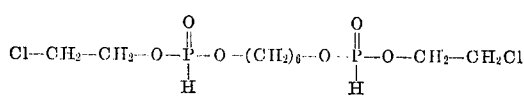

a spatula tip of sodium diethylphosphite is first added followed by about 87 g. of methoxymethyl isocyanate added dropwise at about 50° C. with external cooling and vigorous stirring. The mixture is then stirred for about one hour at about 60 to about 70° C. and is finally degassed under reduced pressure.

About 272 g. of a colorless oil of refractive index $n_D^{20}=1.4819$ are obtained.

EXAMPLE 8

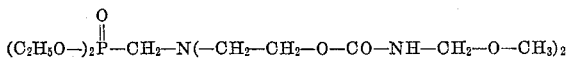

About 174 g. of methoxymethyl isocyanate are added dropwise, with stirring, to about 255 g. of O,O-diethylester of N,N-di-(2-hydroxyethyl)-aminomethylphosphonic acid at about 40 to about 50° C. When the very strongly exothermic reaction has died down, the mixture is stirred for about 4 hours at room temperature and is then degassed at reduced presure. About 429 g. of a yellow oil of refractive index $n_D^{20}=1.4700$ are obtained.

By adding about 12% of the above compound to polymer solutions, e.g. of polyacrylonitrile in dimethylformamide which are then worked up into foils or filaments, the combustibility of these products can be greatly reduced.

EXAMPLE 9

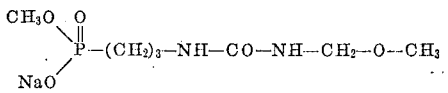

About 48.5 g. of methoxymethyl isocyanate are slowly added, with cooling, to a solution of about 98 g. of the sodium salt of 3-aminopropylphosphonic acid methyl ester in about 100 ml. of ethanol, at about 0 to 10° C. The reaction mixture is then concentrated by reduced evaporation in a rotary evaporator under reduced pressure at about 50° C. About 146 g. of the above compound remain in the residue in the form of a colorless, viscous oil.

EXAMPLE 10

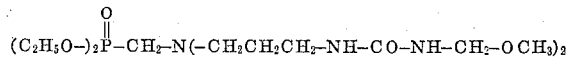

About 127 g. of the O,O-diethyl ester of N,N-di-(3-aminopropyl)-aminomethylphosphonic acid are reacted in ethanolic solution with about 78.5 g. of methoxymethyl isocyanate by the procedure described in Example 9. About 205 g. of the above compound are obtained as reaction product in the form of a brown, viscous oil.

EXAMPLE 11

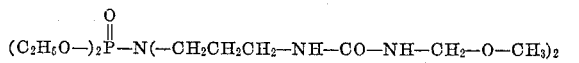

About 113 g. of phosphoric acid, O,O-diethylester N-di-(3-aminopropyl)-amide are reacted with about 74 g. of methoxymethyl isocyanate in ethanol in a manner analogous to that used in Example 9. About 184 g. of a reddish, viscous oil are obtained.

EXAMPLE 12

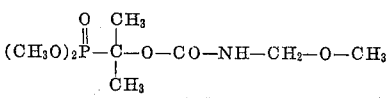

About 75 g. of O,O-dimethylester of 2-hydroxypropyl-2-phosphonic acid are dissolved in about 200 ml. of acetonitrile. After the addition of about 0.1 g. of tin-(II)-dioctoate, about 38.8 g. of methoxymethyl isocyanate are added dropwise to the solution at room temperature, and the reaction mixture is then heated to about 70° C. for about one hour and concentrated by evaporation under reduced pressure. About 100 g. of the above compound remain behind in the residue in the form of colorless crystals which melt at about 58 to 60° C. after reprecipitation in a mixture of benzene and ligroin.

EXAMPLE 13

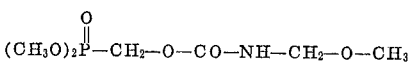

About 140 g. of the O,O-dimethylester of hydroxymethylphosphonic acid are reacted with about 87 g. of methoxymethyl isocyanate by the procedure described in Example 12, and about 500 g. of the above compound are obtained as reaction product in the form of a yellow oil.

Starting from the O,O-dibutyl ester of hydroxymethyl phosphonic acid and methoxymethyl isocyanate, the corresponding N-methoxymethylurethane is obtained as a colorless liquid of refractive index $n_D^{20}=1.4521$.

EXAMPLE 14

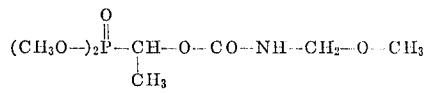

About 368 g. of methoxymethyl isocyanate are added at room temperature to about 652 g. of O,O-dimethylester of 1 - hydroxyethyl-1-phosphonic acid in the presence of about 1 g. of tin-(II)-dioctoate. When the slightly exothermic reaction has died down, the reaction mixture is stirred for about one hour at about 70° C. and is then degasified at this temperature under reduced pressure.

About 991 g. of a yellow liquid of refractive index $n_D^{20}=1.4543$ are obtained.

EXAMPLE 15

The following example illustrates the use of compounds of the invention to impart flame resistance to cellular polyurethane plastics:

About 85 parts of a mixture of about 65 parts of the propylene oxide adduct of 1,1,3-para-hydroxyphenyl propane having a hydroxyl number of about 223 and about 35 parts of the propylene oxide adduct of glycerine having a hydroxyl number of about 652 mixed with about 15 parts of the propylene oxide adduct of diethylene triamine having a molecular weight of about 400 and a hydroxyl number of about 700 and 30 parts of the compound according to Example 14 are combined on a machine mixer as disclosed in Reissue Pat. 24,514 with about 109 parts of the organic polyisocyanate obtained by the phosgenation of the condensation product of aniline and formaldehyde which has an amine equivalent of about 140 and which contains about 31 percent free —NCO with about 40 parts of trichlorofluoromethane, about 1.1 parts of 1-methyl-4-dimethyl amino ethyl piperazine and about 1 part of a silicone oil having the formula

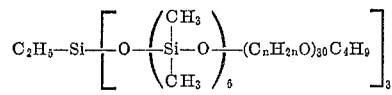

wherein $(C_nH_{2n}O)$ is a mixed polyoxyethylene and oxypropylene block copolymer containing about 17 oxyethylene units and about 13 oxypropylene units. The foam rises in about 100 seconds and is tack-free in about 3 minutes. This foam is self-extinguishing when subjected to a flame.

What is claimed is:

1. As a flame-retarding agent adapted to incorporation into a plastic composition, a sulfur-free phosphorylated N-alkoxy-methylamide of the formula $$(ROCH_2NHCO)_nR'$$

wherein:

R is an alkyl of 1 to 6 carbon atoms;

R' is a radical obtained by removing a Zerewitinoff hydrogen from a sulfur-free compound selected from the group consisting of amides and esters of an acid of phosphorus, said compound having a molecular weight below 600 and from a total of 4 to 18 carbon atoms as benzene rings, straight or branched hydrocarbon groups (1) interrupted with a nitrogen or oxygen atom, and (2) substituted with a hydroxy, unsubstituted amino, lower alkylamino, hydroxy lower alkylamino, aminoalkylamino, lower alkylimino, chloro or bromo group; and n is an integer from 1 to 3 and corresponds to the number of said Zerewitinoff hydrogens so removed.

2. As a flame-retarding agent adapted to incorporation into a plastic composition, a sulfur-free phosphorylated N-alkoxy-methylamide of the formula $$(ROCH_2NHCO)_nR'$$

wherein:

n is an integer from 1 to 3;

R is an alkyl of 1 to 6 carbon atoms; and

R' is a radical obtained by removing the Zerewitinoff hydrogen from one of di-ethoxyphosphonic acid ester of hexamethylene glycol, di-hexamethylene glycol ester of phosphonic acid, di-p-bromophenyl ester of phosphinic acid, di-chloroethylphosphinic acid ester of diethylene glycol, di-ethyl phosphate, mono-1-glyceryl phosphate, mono-aminoethyl phosphate, tri-(di- or tri-ethylene glycol) phosphate, di-bromoethyl-mono - 2-hydroxypropyl phosphate, mono-(di-hydroxyethyl-amido)-di-(2,3-dibromopropyl) phosphate, tri-amino-ethylaminophosphoramide, mono - (di - aminopropyl-amido)-diethyl phosphate, phenylphosphonic acid diamide, dichloroethoxy phosphoramide, N-diphenoxyphosphoryl urea, di-phenyl-amino-phosphine, di-(dimethylamino-p-phenyl) - methylamino-phosphine, diethyl-phosphinic acid hydroxyethyl mono-ester, dimethyl-phosphonic acid amide of hydrazine, 1,2 - ethane-bis-(phenylphosphinic acid-mono-hydroxy ethyl-ester), ethylphosphinic acid di-hexamethylene glycol ester, 2 - aminopropylphenylphosphinic acid ethyl ester, hydroxymethyl-ethylphosphinic acid ethyl ester, α - methylaminobenzyl-methylphosphinic acid ethyl ester, hydroxyethyl-butyl-phosphinic acid propyl ester, di-(aminopropyl)phosphinic acid dimethylamide, ethylphosphinic acid (di- or tri - ethyleneglycol) monoester, phenylphosphinic acid monomethyl ester, phenyl phosphorus acid di-aminobutyl ester, amidocarboxylmethylphosphonic acid diethyl ester, carboxyethylphosphonic acid dimethyl ester, 2 - hydroxypropylphosphonic acid monomethyl ester, dimethylaminomethylphosphonic acid monoethyl ester, trichloromethylphosphonic acid di-hydroxybutyl ester, aminoethylphosphonic acid diethyl ester, 1 - hydroxy - 1,1,-di(diethoxyphosphonyl)-ethane, 1, 1 -di-(dimethoxyphosphonyl) - butylene glycol - 1,4, trichloromethylphosphonic acid diamide, monosodium-monoethyl aminopropylphosphonate, 1-hydroxy-2-trichloroethylphosphonic acid dimethyl ester, 1 - hydroxyallyl-phosphonic acid di-dichloroethyl ester, hydroxymethyl phosphonic acid di-(di- or tri-ethylene glycol) ester, ethylamino-ethylamino-methylphosphonic acid diethyl ester, carbamylphosphonic acid dimethyl ester, 2,3 di-hydroxypropylphosphonic acid diethyl ester, di-(amino propyl)-aminomethylphosphonic acid diethyl ester, 3-aminophenyl-phosphonic acid diethyl ester, p-hydroxy-phenylphosphonic acid dimethyl ester, tri-(4 - aminophenyl) phosphate, 2 - aminoisopropyl-phosphonic acid dimethyl ester, N-hydroxyethyl-N-methyl-aminomethyl-phosphonic acid diethyl ester, phenylphosphonic acid hydroxyethyl - amide, 1,2 - ethane-bis-phosphonic acid tetra - (2 - hydroxypropyl)-ester, mono-hydroxyethyl phosphite, di-hydroxyethyl phosphite, di-chloroethyl phosphite, cyclic ethyleneglycol phosphite, phosphorous acid cyclic ester amide of 2-methylaminoethanol, di-phosphorous acid ester of pentaerythritol, phosphorous acid di-(dimethylamide), diethyl phosphite, dimethyl phosphite, 1 - hydroxy - 2 - trichloroethylphosphonic acid dimethyl ester, di-chloroethyl phosphite, di-allyl phosphite, di-butyl phosphite, aminopropylphosphonic acid mono-sodium salt mono-methyl ester, 2 - hydroxy-isopropylphosphonic acid dimethyl ester, hydroxymethyl-phosphonic acid dimethyl ester, 1-hydroxyethylphosphite diester of hexamethylene glycol, di-(hydroxyethyl)aminomethylphosphonic acid diethyl ester, di-(aminopropyl)aminomethylphosphonic acid diethyl ester, and phosphoric acid diethyl ester (di[aminopropyl])-amide.

3. The agent of claim 2, wherein R is methyl.

4. As a flame-retarding agent adapted to incorporation into a plastic composition, a sulfur-free phosphorylated N-alkoxy-methylamide of the formula:

$$(CH_3-OCH_2-NHCO)_nR'$$

wherein:

$n$ is 1 or 2, and

R' is a radical obtained by removing the Zerewitinoff hydrogen from one of diethyl phosphite, dimethyl phosphite, 1-hydroxy-2-trichloroethyl-phosphonic acid dimethyl ester, di-chloroethyl phosphite, di-allyl phosphite, dibutyl phosphite, aminopropylphosphonic acid mono-sodium salt mono-methyl ester, 2-hydroxyisopropylphosphonic acid dimethyl ester, hydroxymethylphosphonic acid dimethyl ester, 1-hydroxyethylphosphite diester of hexamethylene glycol, di-(hydroxyethyl)aminomethylphosphonic acid diethyl ester, di-(aminopropyl) aminomethylphosphonic acid diethyl ester, and phosphoric acid diethyl ester (di-[aminopropyl])-amide.

References Cited

UNITED STATES PATENTS

| 2,909,558 | 10/1959 | Reetz | 260—943 |
| 3,048,613 | 8/1962 | Ladd et al. | 260—943 |
| 3,069,312 | 12/1962 | Kohn | 260—938 X |

CHARLES B. PARKER, Primary Examiner

ANTON H. SUTTO, Assistant Examiner

U.S. Cl. X.R.

8—115.5, 116 P; 106—15 FP; 260—2.5 AJ, 551 P, 45.7 P, 928, 929, 932, 936, 937, 938, 943